ANDREW B. HESSLER, OF WYOMING, PENNSYLVANIA.

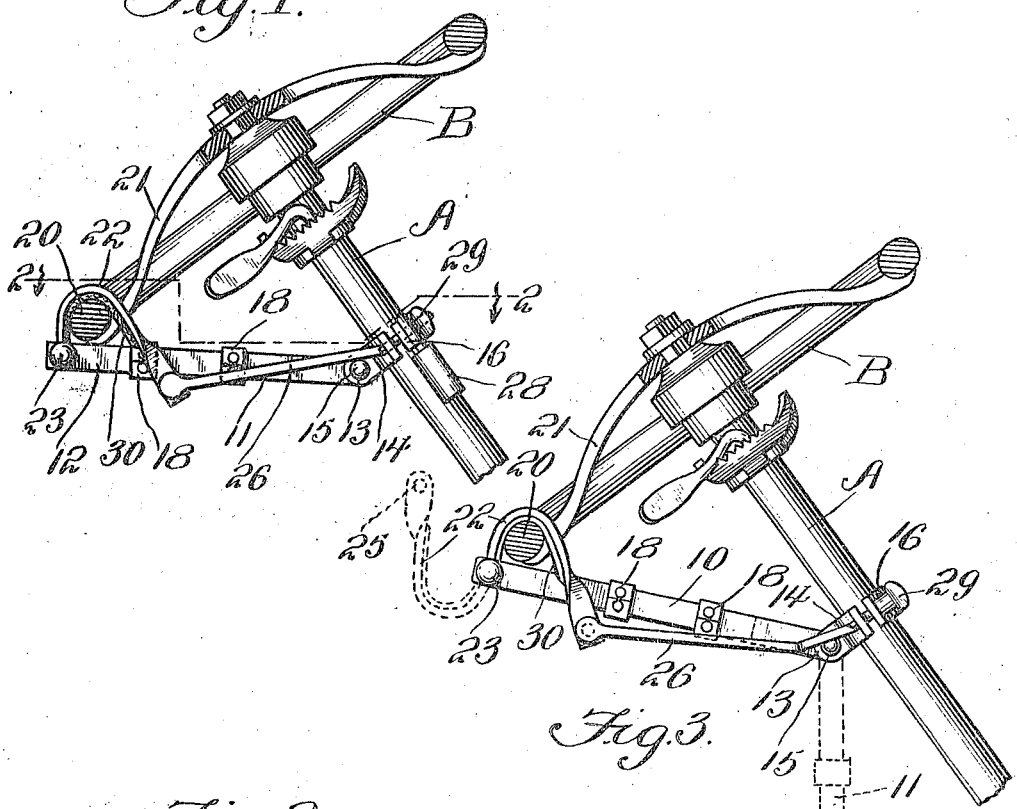

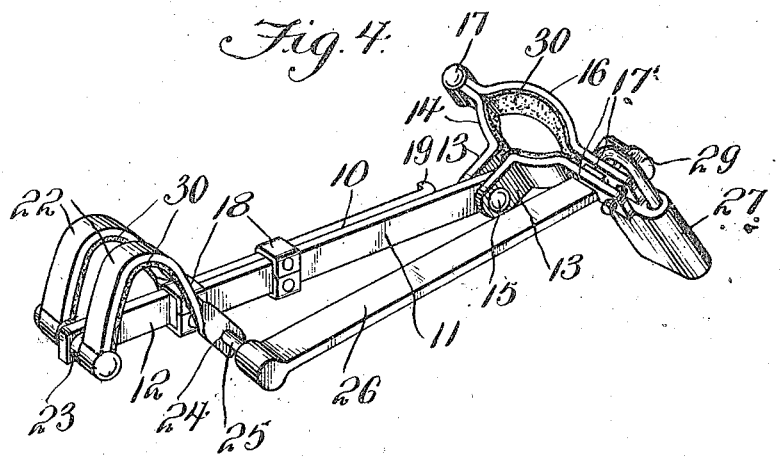
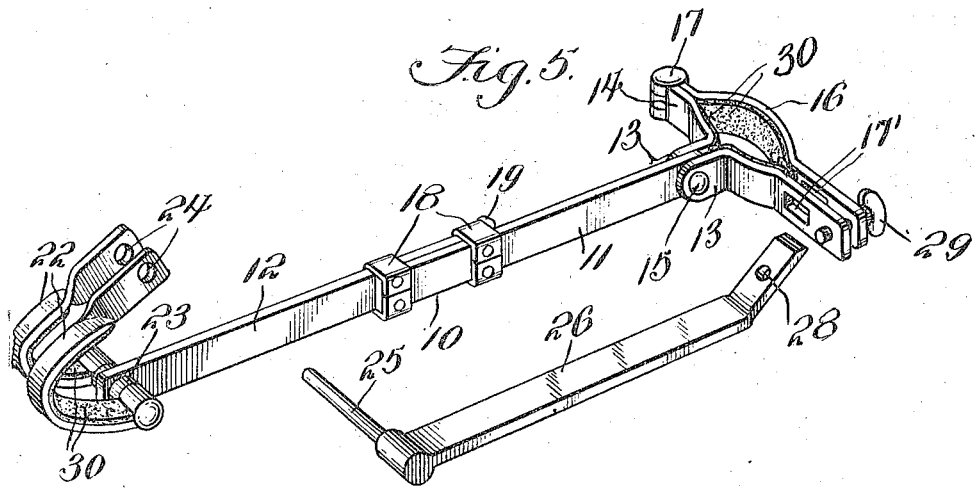

STEERING-WHEEL LOCK.

1,234,023.

Specification of Letters Patent. Patented July 17, 1917.

Application filed January 31, 1917. Serial No. 145,728.

*To all whom it may concern:*

Be it known that I, ANDREW B. HESSLER, a citizen of the United States, residing at Wyoming, in the county of Luzerne and State of Pennsylvania, have invented new and useful Improvements in Steering-Wheel Locks, of which the following is a specification.

This invention relates to steering wheel locks, especially designed for use in connection with motor driven vehicles.

The object of the present invention is to provide a lock of this class, which when positioned upon a steering wheel will prevent rotation of the same, it being impossible to remove the lock without the use of a key.

A further object of the invention is to provide a lock which is constructed in a manner to prevent its being taken apart by unauthorized persons, for the purpose of removing the same from locked position upon the steering wheel, the parts of the lock being riveted together.

A still further object of the invention is the provision of a steering wheel lock which may be quickly adjusted to lock the same upon the steering wheel and steering column and if desired may be unlocked from the steering wheel without removing the same from the said steering column the lock being capable of swinging downward along the post and out of the way.

A further object of the invention is the provision of a lock which may be adjusted to suit the diameters of different makes and sizes of steering wheels, so as to permit of its universal use.

With the above and other objects in view the invention consists of the following novel combination and arrangement of parts, hereinafter more fully described and illustrated in the accompanying drawings, in which:

Figure 1 is a side elevation of a lock in position upon the steering wheel;

Fig. 2 is a plan view of the same;

Fig. 3 is a vertical sectional view illustrating by dotted lines the manner of disengaging the lock from the steering wheel;

Fig. 4 is a perspective view of the device removed from the wheel and steering column, but showing the locked position of the parts as they would appear when in engagement; and Fig. 5 is a similar view with the hook members raised and the radial connecting bar extended and the locking bar disengaged.

Referring to the drawings in detail, the invention comprises a pivoted extensible connecting bar 10, the said bar comprising the inner member 11 and the outer member 12. The inner member is pivoted between the ears 13 formed upon one half of a securing clip, the pivot which is in the form of a rivet being shown at 15. The other half of the securing clip is indicated at 16 and is pivoted to the portion 14 as shown at 17. The opposite end of the two halves 14 and 16 of the clip are provided with alined transverse openings 17', the purpose of which will be presently described. In order to provide for the extensible engagement of the bar 10, the member 11 is provided with guiding strips 18, through which the member 12 is adapted to slide, the inner end of the member 12 being provided with a laterally extending portion 19 for the purpose of preventing the disengagement of the two members of the bar 10. When the lock above described is positioned upon the steering column A, the bar 10 will be radially arranged with respect to the wheel B, so that the means provided upon the outer end of the said bar may be engaged with the rim 20 and the spoke 21 of the said wheel.

The means just mentioned includes a pair of hooks 22 which are pivoted upon the transverse bar 23 carried by the outer end of the member 12, the said hooks being riveted in position upon the bar in order to prevent their unauthorized removal. These hooks are disposed one upon either side of the bar 10, and are provided at their free ends with apertures 24, for the passage of the transverse bolt 25, which is carried by and forms a part of a right angular locking bar 26. The opposite end of this bar is bent at an obtuse angle and is adapted to pass through the alined openings 17' of the clip and to be locked in position therein by means of a suitable lock 27 which is adapted to engage an opening 28 formed in the end of this bar.

In order that the clip may be permanently secured to the column A if desired, the free ends of the two halves 14 and 16 of the clip are formed with openings, one of which is threaded so as to permit of the locking engagement with a set screw 29.

When it is desired to secure the lock in position the clip is first secured to the column A and the steering wheel is turned so that one of the spokes 21 will be positioned above the connecting bar 10. The said bar is then adjusted so as to permit of the hooks 22 being swung over the top of the rim 20, the bar 10 being below the said rim. The locking bar 25 is positioned within the openings 24 and 17' and the lock 27 is engaged in the aperture 28 of the said bar. If desired the entire device may be removed from the steering wheel and column when not in use, or it may remain in the position shown by dotted lines in Fig. 1.

The clip which engages the column A, and the hooks 22 are all provided with a lining 30, so as to prevent scratching and marring of the parts.

Having described the invention, what is claimed, is:

1. The combination with a steering wheel, of a connecting bar, means carried by one end of said bar for engagement with the steering wheel, means carried by the opposite end of said bar for engagement with a steering column, a removable locking bar adapted to engage both the said steering wheel engaging means and said steering column engaging means and means for securing said locking bar in its engaged position.

2. The combination with a steering wheel, of a connecting bar, hooks carried by one end of said bar for engagement with the steering wheel, means carried by the opposite end of said bar for engagement with the steering column, a removable locking bar, one end of which is adapted to be positioned transversely beneath the connecting bar and engaged with said hooks and means for securing the opposite end of said locking bar to the steering column engaging means.

3. The combination with a steering wheel, of a connecting bar, means for securing one end of said bar to the steering column, means carried by the other end of the said bar for engagement with the rim and spoke of the steering wheel, a locking bar having one end engageable with the steering wheel engaging means and the opposite end engageable with the means for securing the connecting bar to the steering column and means for locking said bar in position.

4. The combination with a steering wheel, of a connecting bar, means carried at one end of said bar for engagement with a steering column, hooks pivoted at the opposite end of said connecting bar for engagement with the rim of the steering wheel, the free ends of the said hooks being provided with alined transverse openings disposed below the plane of the connecting bar, a laterally extending pin carried by one end of said locking bar for engagement with the openings of said hooks, whereby said pin will be engaged with said hooks beneath the connecting bar and means for securing the opposite end of the locking bar to the steering column engaging means.

5. The combination with a steering wheel, of a connecting bar, means carried at one end of said bar for engagement with said wheel, a hinged collar pivotally connected to the opposite end of said connecting bar for engagement with the steering column, extensions provided upon the free ends of said collar and having alined openings therein, a locking bar, means for removably securing said bar to the steering wheel engaging means and means whereby the opposite end of the locking bar may be secured within the alined openings of the hinged collar extensions to prevent removal of the connecting bar.

In testimony whereof I affix my signature.

ANDREW B. HESSLER.